United States Patent [19]

Weiss

[11] Patent Number: 4,738,994

[45] Date of Patent: * Apr. 19, 1988

[54] EPOXY RESIN-POLYAMMONIUM SALT EMULSION AND PROCESS FOR ITS PRODUCTION

[75] Inventor: Jörn-Volker Weiss, Haltern, Fed. Rep. of Germany

[73] Assignee: Huels Aktiengesellschaft, Marl, Fed. Rep. of Germany

[*] Notice: The portion of the term of this patent subsequent to Nov. 11, 2003 has been disclaimed.

[21] Appl. No.: 681,475

[22] Filed: Dec. 14, 1984

[30] Foreign Application Priority Data

Dec. 15, 1983 [DE] Fed. Rep. of Germany ....... 3345398

[51] Int. Cl.$^4$ .................. C08L 63/00; C08K 5/16; C08J 3/06
[52] U.S. Cl. ..................... 523/401; 106/90; 156/330; 523/408
[58] Field of Search ................. 106/90; 523/401, 408, 523/412; 156/330

[56] References Cited

U.S. PATENT DOCUMENTS

| | | | |
|---|---|---|---|
| 3,020,250 | 2/1962 | Norwalk | 523/417 |
| 3,798,191 | 3/1974 | Donnelly | 523/401 |
| 3,879,324 | 4/1975 | Timmons et al. | 523/402 |
| 3,926,886 | 12/1975 | Kelley et al. | 106/90 |
| 4,440,882 | 4/1984 | Weiss et al. | 523/401 |
| 4,442,245 | 4/1984 | Weiss et al. | 523/401 |
| 4,514,467 | 4/1985 | Riemer et al. | 428/413 |

FOREIGN PATENT DOCUMENTS 1113205  5/1968  United Kingdom ............... 106/90

*Primary Examiner*—Ronald W. Griffin
*Attorney, Agent, or Firm*—Millen & White

[57] ABSTRACT

An epoxy resin-polyammonium salt emulsion is based on a liquid epoxy resin, a latent curing agent, an emulsifier, and water. The emulsion is used in epoxy resin-cement mortars, in alkaline curing cement mixtures, and in adhesive compositions based on hydraulically setting alkaline cement binders.

19 Claims, No Drawings

EPOXY RESIN-POLYAMMONIUM SALT EMULSION AND PROCESS FOR ITS PRODUCTION

CROSS REFERENCE TO RELATED APPLICATION

This application is related to commonly assigned application Ser. No. 681,474, filed Dec. 14, 1984, filed on even date.

BACKGROUND OF THE INVENTION

For the past several years, experts have noticed that the condition of many relatively new buildings has deteriorated markedly. Several causes have been cited:

1. While older buildings were often constructed in a massive mode, for esthetic reasons and to keep costs low less massive structures have been preferred in constructing newer buildings.
2. Not only changing weather conditions (temperature, sunlight, moisture), but also to an increasing extent chemical influences (deicing salt, carbon dioxide, nitrogen oxides, sulfur dioxide) contribute toward a rapid deterioration of conventional building materials. The combination of physical changes and chemical attack results in carbonatization of concrete, in elimination of passivation and formation of metal rust, and in peeling off of a structure's facing.
3. At the same time, physical stresses increase, e.g., bridges carry an increased volume of traffic including heavy freight carrying trucks.

Rarely is the tearing down and complete rebuilding of damaged structure economically justified. Obviously, the better approach is to preserve and restore. There is a need for better procedures, and more particularly better materials making it more feasible to effect restoration. Epoxy resin-cement mortars, chemically compatible with steel and concrete, are especially well suited for this purpose.

A plastic-containing binder is disclosed, for example, in DAS 1,198,267, consisting of a hydraulic cement, water, an epoxy resin curable at normal temperature, and a curing agent. Preparation of this binder is cumbersome since two premixes must be produced separately from each other and may be combined only immediately prior to use. The relatively brief processing time of about 1-2 hours is the basic drawback not only in using this system but also in all so-called 2K systems (see, for example, DOS 2,840,874). After each use, all processing equipment which has been in contact with the binder, must be thoroughly cleaned to avoid clogging and the formation of difficult to remove deposits.

U.S. Pat. No. 3,926,886 relates to a 1K epoxy resin-diammonium acetate or formate emulsion consisting of a liquid epoxy resin, water and a substituted diammonium salt, with curing taking place in the presence of cement. The diammonium salt performs a dual function: after reaction with the alkaline-acting cement, the less basic diamine is liberated (a) curing the epoxy resin and (b) serving as an emulsifier. However, the resultant emulsion may not be stable, especially if the work is to be conducted under extreme weather conditions. Accordingly, the patentees propose to add up to 15% of a commercial emulsifier to the mixture being emulsified. Even so, stability of the emulsion is not certain.

In EP-A1-00 43 463, acid is added to keep the amine component from reacting with the epoxy resins at elevated temperature; any adducts formed are rendered water-soluble and dispersible by addition of the acid. In the present invention, the goal is to prepare an emulsion from a diammonium salt and an epoxy resin wherein the curing process is initiated at temperatures of above 0° C. only upon addition of an alkaline-reacting compound.

The patent literature describes numerous emulsifiers suitable for use in conjunction with equeous epoxy resin dispersions:

U.S. Pat. No. 3,879,324:
  Surface-active compounds, such as anionic and cationic compounds.
Canadian Pat. No. 879,750:
  Mixtures of nonylphenoxypoly(thoxy)$_{19}$ethanol and alkylene oxide extended alkyl phenol polyglycol ethers.
German Pat. No. 2,800,323:
  Poly(ethylene oxide) esters of fatty acids.
DAS 1,669,772:
  Addition products of 25-30 moles of alkylene oxide and abietic acid.
U.S. Pat. No. 3,020,250:
  Synthetic compounds, proteins.
DOS 1,925,941:
  Amine-epoxy resin condensation products.
DAS 2,332,165:
  Mixtures of abietic acid polyglycol esters, polyglycol ethers of fatty acids and/or polyglycol ethers of p-alkyl phenol and long-chain aliphatic alcohols of 8-18 carbon atoms.

East German Pat. No. 135,915 describes 2K dispersions containing a polysulfide, a polyepoxide, and a polyvinyl alcohol, utilized as coating agents or as cement additives. Building materials containing organically bound sulfur are not in general use since it can accelerate the corrosion of steel.

More recently, formulations were developed superior to those described in U.S. Pat. No. 3,926,886 with regard to availability of the amine component, stability of the emulsion and spectrum of usage. German patent application P 32 22 531.8, corresponding to U.S. Pat. No. 4,442,245, teaches emulsions consisting of an epoxy resin, a primary aliphatic $C_{12-14}$-alcohol and/or its adduct with ethylene oxide groups, water, and the salt of an alkylene diamine and oxalic acid. In German Patent Application P 32 22 528.8, corresponding to U.S. Pat. No. 4,440,882, the salt of a polyamine or a polyaminoamide with oxalic acid is utilized as the latent curing agent.

Notwithstanding these improvements, stability of the emulsion remains uncertain. Problems occur, particularly, if the epoxy resin itself is not readily emulsifiable in water. Also, the formation of air pores due to entrained air has an adverse effect when such emulsions are used to produce mortars.

Although it is known that it is possible to improve the flexibility of concretes by means of certain polymer additives (European Laid-Open Application 0 055 035), it is likewise known that concretes containing polyvinyl acetate have not proven themselves under practical conditions. This is due to the fact that, under the influence of moisture, the polyvinyl acetate is saponified forming polyvinyl alcohol. At the same time, the technical properties of the concrete are impaired (see DOS 31 36 737).

OBJECT OF THE INVENTION

Therefore, it is an object of the present invention to provide improved epoxy resin-polyammonium salt emulsions.

A further object of this invention is to make improved available emulsions suitable for various restoration and construction purposes.

Upon further study of the specification and appended claims, further objects and advantages of this invention will become apparent to those skilled in the art.

SUMMARY OF THE INVENTION

Emulsions have now been discovered which meet these objectives.

These components of the epoxy resin-polyammonium salt emulsions according to the present invention can be characterized in greater detail as follows:

a liquid epoxy resin,
water,
an emulsifier comprising
  (a) a polyvinyl alcohol obtained by saponification of polyvinyl acetate with a degree of hydrolysis of at least 70% and a molecular weight of at least 5,000,
  (b) a polyoxazoline having a molecular weight of 10,000–100,000, and/or
  (c) a copolymer of N-vinylpyrrolidone with
    vinyl esters of mono- or dibasic carboxylic acids of up to 6 carbon atoms,
    (meth)acrylic esters of mono- and dihydric alcohols of up to 6 carbon atoms,
    maleic, fumaric, crotonic acid and/or
    styrene, and
a latent curing agent comprising the salt from a
  (a) polyamine of Formula $H_2N-CH_2-CH_2-N-H-_xH$ where $x=2, 3,$ and 4 or its amino-group-containing reaction product with fatty acids,
with
  (b) optionally hydroxy-group-containing, aliphatic, cycloaliphatic, or aromatic mono- or dicarboxylic acids of up to 12 carbon atoms.

It is to be expressly pointed out that emulsions, within the scope of this application, mean not only the two-phase systems formed by dispersing a liquid phase in another liquid phase, but also those systems wherein a solid phase is dispersed in a liquid phase, as well as all transition stages of these two systems.

DETAILED DISCUSSION

The epoxy resins are liquid compounds based on 2,2-bis(4-hydroxyphenyl)alkanes and epichlorohydrin or glycidol, commercially available as EUREPOX by Schering, Berlin. Especially suitable are epoxy resins that can be emulsified in water, such as, for example, RUTAPOX VE 2913 by Bakelite GmbH, Duisburg.

The latent curing agent is the polyammonium salt of an organic acid. Especially suitable as the polyamine components are diethylenetriamine (DETA), triethylenetetramine(TETA), and tetraethylenepentamine (TEPA). Also particularly suitable is the reaction product obtained by reacting such polyamines with a less than stoichiometric amount of fatty acid, generally a dimerized, unsaturated fatty acid such as dimerized linoleic acid. The reaction product contains besides the reactive amino groups, amide groups and also in many cases imidazoline units (cf. also H. Lee, C. Neville, "Handbook of Epoxy Resins" McGraw Hill, New York, chapter 10). The exact chemical structure of the commercially available products, such as, for example, VERSAMID 125 (cf. DOS 2,262,791) and VERSAMID 140, as well as EUREDUR 250 of Schering, Berlin, is undetermined. The amount of polyamine used depends on the nature of the epoxy resin, for example, its epoxy value or the mixture ratio of resin and curing agent indicated by the resin manufacturer.

The acid used to form a salt with the polyamine can be mono- or dibasic, and can contain hydroxy groups and have up to 12 carbon atoms. It can be saturated or unsaturated, aliphatic, cycloaliphatic, or aromatic. Formic acid, acetic acid, oxalic acid, adipic acid, tartaric acid, and phthalic acid are preferred.

The amount of water required to prepare the emulsion is dependent on the type of amine component utilized with polyamines, it ranges between 30% and 75%; with the reaction products of these polyamines with fatty acids, it is between 200% and 350%, in both cases based on the amount of epoxy resin present. Optimum amounts can be readily determined by comparative tests.

With regard to the emulsifier, the polyvinyl alcohol component is obtained by the saponification of polyvinyl acetate. It has a degree of hydrolysis of at least 70% and a molecular weight of at least 5,000, especially 10,000–100,000 (see Rompps Chemie-Lexikon, 7th edition). The polyoxazoline has a molecular weight of 10,000–100,000 and is obtained by polymerization of 2-alkyl-$\Delta^2$-oxazolines wherein the alkyl group has 1–5 carbon atoms (see DOS 30 36 119 and Angew. Chemie 78:913 [1966]). Copolymers N-vinylpyrrolidone with
  (a) vinyl esters of mono- or dibasic carboxylic acids of up to 6 carbon atoms,
  (b) (meth)acrylic esters of mono- and dihydric alcohols of up to 6 carbon atoms,
  (c) maleic, fumaric, crotonic acid and/or
  (d) styrene
are described in the following German patents: Nos. 2,218,935; 2,255,263; 2,456,807; and 2,514,127. Especially suitable is COLLACRAL VL, a product of BASF, Ludwigshafen. The emulsifier is utilized, based on the quantity of epoxy resin, in amounts of 0.5–40% by weight.

Undesirable formation of air pores can occur during mixing of the emulsion with fresh concrete. This phenomenon can be suppressed in a simple way by adding 0.5–5% by weight of a defrother, based on the total weight of the emulsion. Especially suitable are defrothers based on silicones or hydrocarbons, such as, for example, RD defrother emulsion from Dow Corning, Duesseldorf; the defrother NOPCO by Munzing Chemie GmbH, Heilbronn; or the DEHYDRAN types by Henkel KGaA.

Additionally, other auxiliary agents can be added to the emulsion, such as concrete thinners and accelerators (see European Laid-Open Application 0 090 434).

Concrete thinners based on melamine resins, such as, for example, MELMENT (Manufacturer: Sueddeutsche Kalkstickstoff-Werke AG, D-8223 Trostberg) serve for increasing the fluidity of mortar mixtures. Their proportion is 0.1–8%, based on the total weight of the emulsion.

Accelerators effect a rapid and complete curing of the epoxy resin. Suitable accelerators are N- and P-containing compounds, conventional in principle, especially tertiary amines of up to 20 carbon atoms and esters of phosphorous acids of up to 25 carbon atoms, such as, for example, N-benzyldimethylamine and triphenylphosphite. They are used in amounts of 2–5%, based on the epoxide.

The emulsions are prepared by
first providing an aqueous solution of the emulsifier,
optionally adding a defrother,
adding the acid,
adding such an amount of polyamine that a pH of 6–6.5 is attained,
optionally adding further auxiliary agents, such as, for example, concrete thinners and accelerators, and
finally stirring the liquid epoxy resin into the resultant mixture.

Deviations from this usual preparation method are possible and can be advantageous in certain cases. Thus, the sequence of adding the acid and the polyamine can be reversed, for example. It is also possible to prepare the polyammonium salt separately beforehand and then add same to the mixture. In all these cases, the decisive factor is that the pH value of the mixture must lie below 7, better below 6.5, at the time the epoxide is added under agitation. On the other hand, the pH value, should not be below 6, since otherwise the hydraulic binder is deprived of too much alkalinity. After the addition step is completed, the mixture is stirred for another 0.5–1.0 hour. In this way, emulsions are obtained which are stable for months at room temperature. In case of the occurrence of phase separation, the mixtures can be rapidly homogenized again by another agitation step.

The emulsions according to invention exhibit the property of being cured only in the presence of alkaline agents, such as inorganic bases, cement, and other alkaline-setting binders. Although curing is customarily conducted in the presence of cement, also suitable are curing mixtures which contain alkali hydroxides or alkaline earth hydroxides, calcium oxide, or other basic-reacting oxides. Mineral fillers, such as sand, finely ground silicon dioxide, and similar fillers, do not interfere with the curing process.

The emulsions according to the present invention are usable in an extremely variegated fashion in the construction field, wherein particular emphasis is given to application in the restoration of already existing buildings.

The emulsions of the invention are especially suited for use in the dry grouting method (method of dry application with a cement gun) (cf. DOS 31 36 737). For example, if it is desired to treat vertical walls, ceilings, pipes, or tunnels with concrete, concrete mixtures are required which adhere almost completely after being sprayed onto the wall surface. The present emulsions fulfill this requirement. By varying the amount of water, and other components, it is possible to prepare emulsions with differing synthetic resin/cement ratios meeting the requirements of the substrate. Preferably, the water/cement ratio is 0.35–0.65, and the ratio of epoxide and diamine to cement is 0.035–0.15.

Cured epoxy emulsion mortars have, as compared with conventional mortars, a higher resistance against water penetration, even when the water has chemicals, etc. dissolved therein. For this reason, the emulsions are excellently suited for the manufacture of prefabricated concrete parts, such as, for example, wastewater and sewage pipes.

Mastic and adhesive compositions based on hydraulically setting binders which are utilized, for example, in the tile art, advantageously contain the disclosed emulsions in amounts of between 3% and 75%. Adhesive strength and processing time correspond to the values required in this art.

The same also holds true for injection compositions based on hydraulically setting binders utilized for the restoration of buildings of all types. Here again, high adhesive strength is the determining factor.

Finally, the emulsions of the present invention are employed for the production of flooring plaster, especially if the surface is subjected to extraordinary loads.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

(a) PREPARATION OF THE EMULSIONS (The quantitative data for oxalic acid refer in all cases to the dihydrate.)

Example 1

A flat-bottomed flask with mechanical agitator is charged with 300 parts by weight of water, 100 parts by weight of an aqueous 10% polyvinyl alcohol solution (PVAL GH-20 of Nippon Synthetic Chemical Industry Co., Ltd., Osaka, Japan), and 5 parts by weight of a silicone-containing defrother (RD defrother emulsion by Dow Corning, Duesseldorf). In the resultant mixture, 18 parts by weight of oxalic acid and 25 parts by weight of acetic acid are dissolved. Subsequently 100 parts by weight of the polyaminoamide VERSAMID 140 (Schering, D-1000 Berlin) is added in incremental portions so that the reaction temperature does not rise above 70° C. The reaction mixture is agitated until the polyammonium salt is homogeneously distributed. The mixture is combined under agitation with 200 parts by weight of the epoxy resin RUTAPOX VE 2913. After this addition, the emulsion is stirred for another hour.

TABLE 1

| Composition | Examples | | | | |
|---|---|---|---|---|---|
| | 1 | 2 | 3 | 4 | 5 |
| Water | 300 | 400 | 120 | 400 | 300 |
| Emulsifier[1] | 100 | 100 | 100 | 100 | 100 |
| Defrother[1] | 5 | 5 | 6 | 6 | 5 |
| Acid | Oxalic/Acetic Acid | Oxalic/Acetic Acid | Oxalic Acid | Oxalic/Tartaric Acid | Oxalic/Acetic Acid |
| Acid Amount | 18/25 | 25/31 | 54 | 23/25 | 18/25 |
| Polyamine | "VERSAMID" 140 | "VERSAMID" 125 | "VERSAMID" 140/TETA | "EUREDUR" 250[2] | "VERSAMID" 140 |
| Polyamine Amount | 100 | 178 | 20/27 | 102 | 100 |
| Epoxy Resin | "RUTAPOX" VE 2913 | "RUTAPOX" VE 2913 | "RUTAPOX" VE 2913 | "RUTAPOX" VE 2913 | "EPIKOTE" 828 |

TABLE 1-continued

| Composition | Examples | | | | |
|---|---|---|---|---|---|
| | 1 | 2 | 3 | 4 | 5 |
| Epoxy Resin Amount | 200 | 200 | 240 | 200 | 200 |

[1] As indicated in Example 1.
[2] This is a product of Schering AG, Berlin.

TABLE 2

| Composition | Examples | | | |
|---|---|---|---|---|
| | 6 | 7 | 8 | 9 |
| Water | 100 | 80 | 80 | — |
| Emulsifier | "COLLACRAL" VL | "COLLACRAL" VL | "PVAL" GH-20[2] | "PVAL" GH-20[2] |
| Emulsifier Amount | 33 | 35 | 100 | 100 |
| Defrother[1] | 4 | 4 | 5 | 5 |
| Polyammonium Salt | TETA/Oxalic Acid | DETA/Oxalic Acid | TETA/Oxalic Acid | DETA/Oxalic Acid |
| Polyammonium Salt Amount | 73 | 62 | 73 | 62 |
| Epoxy Resin[3] | 200 | 200 | 200 | 200 |

[1] See Example 1.
[2] This is the polyvinyl alcohol "PVAL" GH-20 (manufacturer: Nippon Synthetic Chemical Industry Co., Ltd., Osaka, Japan) used in the form of a 10% aqueous solution.
[3] This is in all cases the epoxy resin "RUTAPOX" VE 2913 (manufacturer: Bakelite, Duisburg).

(b) PREPARATION OF EPOXY RESIN-CEMENT MORTAR

Examples 10.1-10.3

For the production of epoxy resin-cement mortars, portland cement 35 F, sand, water, and emulsion were mixed in accordance with DIN 1164 and tested for strength after four weeks of storage (data in parts by weight).

| Mixtures | Ex. 10.1 | Ex. 10.2 | Ex. 10.3 |
|---|---|---|---|
| Cement PC 35 F | 100 | 100 | 100 |
| Water | 55 | 44.5 | 44 |
| Emulsion as per Ex. 3 | — | 28.7 | — |
| Emulsion as per Ex. 8 | — | — | 29 |
| Sand 0/1 mm | 230 | 230 | 230 |
| Sand 1/2 mm | 130 | 130 | 130 |

Flexural tensile strength (FTS) and compressive strength (CS) after storage for 7 days under moist conditions for 21 days in a room (A), and after 28 days in a room (B):

| Mixtures | Ex. 10.1 | Ex. 10.2 | Ex. 10.3 |
|---|---|---|---|
| A: FTS (N/mm$^2$) | 8.7 | 9.6 | 9.4 |
| CS (N/mm$^2$) | 40.5 | 41.0 | 38.6 |
| B: FTS (N/mm$^2$) | 6.2 | 10.5 | 8.8 |
| CS (N/mm$^2$) | 27.0 | 38.0 | 32.5 |

(c) PREPARATION OF ADHESIVE COMPOSITIONS

Examples 11.1 and 11.2

Portland cement 35 F was mixed with emulsions to produce the adhesive compositions.

| Mixtures | Example 11.1 | Example 11.2 |
|---|---|---|
| Portland cement 35F | 100 | 100 |
| Emulsion as per Example 1 | 55 | — |
| Emulsion as per Example 8 | — | 50 |

After storage for 3 days under moist conditions and 4 days in a room, the following strength data were determined (in N/mm$^2$) for the test specimens:

| Mixtures | Example 11.1 | Example 11.2 |
|---|---|---|
| Flexural tensile strength | 9.2 | 11.0 |
| Compressive strength | 61.5 | 67.3 |
| Tensile adhesion to steel | 1.3 | 1.5 |
| Tensile adhesion to concrete | 2.4 | 2.9 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A stable epoxy resin-polyammonium salt emulsion comprising
    a liquid epoxy resin,
    water,
    a latent curing agent which is the salt from (a) a polyamine of the formula H$_2$N—(CH$_2$—CH$_2$—NH)$_x$—H where x=2, 3, or 4, or its amino-group-containing reaction product with a fatty acid, and
    (b) an aliphatic, cycloaliphatic, or aromatic mono- or dicarboxylic acid of up to 12 carbon atoms,
    and an emulsifier which is
    (a) a polyvinyl alcohol obtained by saponification of vinyl acetate and having a degree of hydrolysis of at least 70% and a molecular weight of at least 5,000,.
(b) a polyoxazoline having a molecular weight of 1,000–100,000, or
(c) a copolymer of N-vinylpyrrolidone with
a vinyl ester of a mono- or dibasic carboxylic acid of up to 6 carbon atoms,
a (meth)acrylic ester of a mono- or dihydric alcohol of up to 6 carbon atoms,
maleic, fumaric, or crotonic acid, or
styrene.

2. An epoxy resin-polyammonium salt emulsion according to claim 1, wherein the epoxy resin is emulsifiable in water.

3. An epoxy resin-polyammonium salt emulsion according to claim 1, wherein the emulsifier is a polyvinyl alcohol having a molecular weight of 10,000–100,000.

4. An epoxy resin-polyammonium salt emulsion according to claim 1, wherein the acid component of the latent curing agent is phthalic acid, tartaric acid, oxalic acid, acetic acid or formic acid.

5. An epoxy resin-polyammonium salt emulsion according to claim 1, wherein the emulsion contains a silicone or hydrocarbon defrother.

6. An epoxy resin emulsion of claim 1, wherein the amount of emulsion is 0.5–40% by weight.

7. An epoxy resin emulsion of claim 1, further comprising 0.5–5% by weight of a defrother.

8. An epoxy resin emulsion of claim 1, wherein the amount of water is 30–350% based on the amount of epoxy resin.

9. An epoxy resin emulsion of claim 1, wherein component (b) of the salt is one of said acids which also contains an hydroxy group.

10. An epoxy resin emulsion of claim 1, wherein the polyamine component of the salt is diethylenetriamine, triethylenetetramine, or tetraethylenepentamine.

11. An epoxy resin emulsion of claim 1, wherein component (b) of the salt is oxalic, acetic or tartaric acid.

12. A process for the production of an epoxy resin-polyammonium salt emulsion according to claim 1 which comprises
(a) providing an aqueous solution of the emulsifier,
(b) adding the acid to the solution,
(c) adding an amount of polyamine so that the pH value of the resultant solution ranges between 6 and 6.5, and
(d) stirring the liquid epoxy resin into the resultant mixture.

13. A process according to claim 12, wherein a defrother is added prior to adding the acid.

14. In epoxy resin-cement mortars, the improvement which comprises using a epoxy-resin-cement mortar according to claim 1.

15. In curing cement mixtures containing alkaline-reacting compounds, the improvement which comprises using an epoxy resin-polyammonium emulsion according to claim 1.

16. A mixture of claim 15 further comprising a mineral filler.

17. In adhesive and mastic cement compositions based on hydraulically setting alkaline binders, the improvement which comprises using an epoxy resin-polyammonium emulsion according to claim 1.

18. A method of curing an epoxy resin emulsion of claim 1, comprising admixing therewith an effective amount of an alkaline agent.

19. A method of claim 18, wherein the alkaline agent is cement.

* * * * *